Oct. 26, 1965  A. W. KROLL  3,214,680
PHASE SENSITIVE A.C. LIMITING CIRCUIT
Filed July 11, 1963
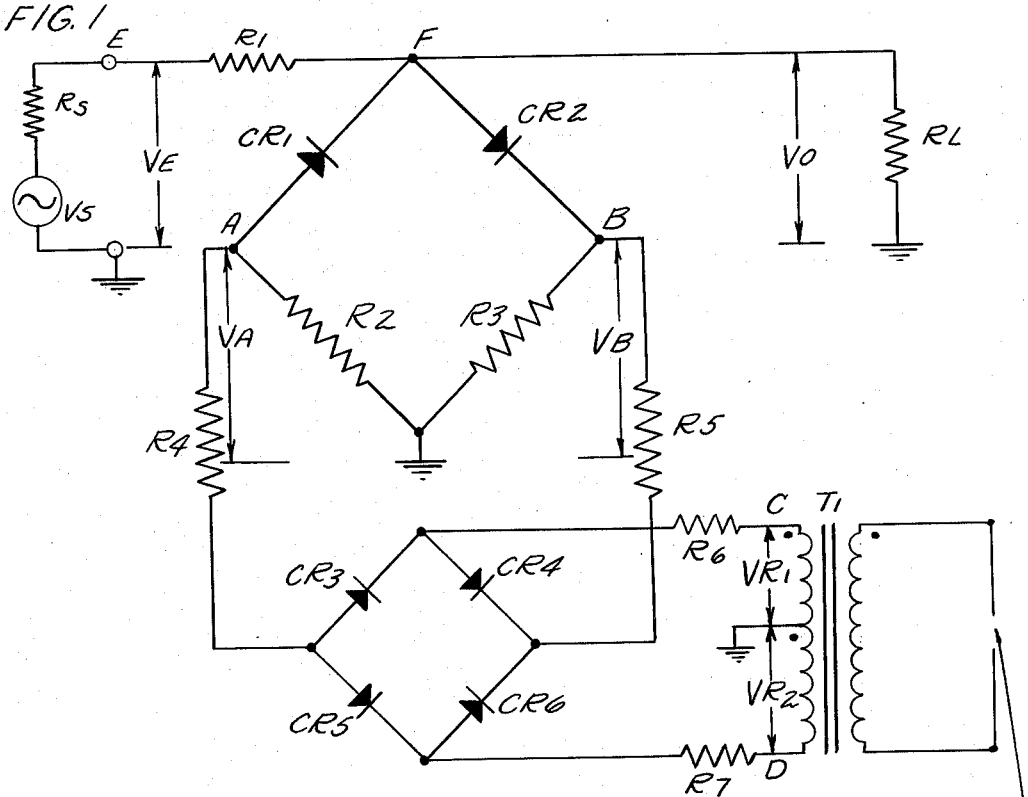
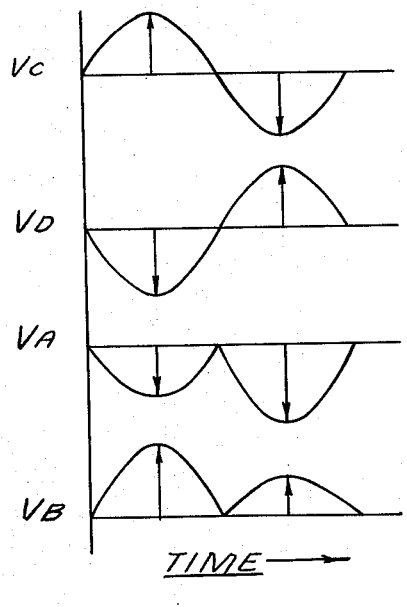
INVENTOR
ARTHUR W. KROLL
BY Donald J. Bradley
AGENT

United States Patent Office 3,214,680
Patented Oct. 26, 1965

3,214,680
PHASE SENSITIVE A.C. LIMITING CIRCUIT
Arthur W. Kroll, Thompsonville, Conn., assignor to United Aircraft Corporation, East Hartford, Conn., a corporation of Delaware
Filed July 11, 1963, Ser. No. 294,426
6 Claims. (Cl. 323—74)

This invention relates to a phase sensitive A.C limiting circuit, and in particular to a limiting circuit which produces a sinusoidal output voltage while limiting the voltage to discreet R.M.S. values. The circuit is phase sensitive in that the voltage will be limited to one value for in-phase signals, and to another value for out-of-phase signals.

In the past, A.C. limiting has usually performed by means of two diodes connected across the line. D.C. bias voltages were applied to the diodes, and when the line voltage exceeded the bias voltage, one of the diodes conducted thereby limiting the peak value of the line voltage to the D.C. bias voltage. If this diode limiting is used to limit a sine wave, the limited R.M.S output is not discreet, and the output waveform becomes distorted and approaches a square wave when the input signal is much larger than the D.C limit level. By means of this invention, the output voltage limit is shaped and thereby can be controlled to a discreet R.M.S. value and fixed waveform.

A novel feature of this invention is the ability to limit at different discreet outputs for in-phase signals and out-of-phase signals by controlling the ratio between two resistors, or by controlling the ratio between two reference voltages.

The invention basically consists of the use of shaped reference voltages to bias the voltage at which the limiting diodes or limiting transistors conduct. If a sine wave output is desired, a sine wave reference voltage of the same frequency as the input voltage may be used. While the invention will be described as utilizing a sine wave reference voltage, it is apparent that other reference voltage wave shapes, such as a square or triangular wave, may be used. The circuit of this invention is particularly adapted to a phase sensitive control system where the phase of the error signal is determined by the polarity of the error, the error signal having two states, i.e., in phase with a reference or 180° out of phase with the reference It is therefore an object of this invention to provide a novel phase sensitive A.C. limiting circuit.

Another object of this invention is a novel phase sensitive A.C. limiting circuit in which the output voltage is limited to different discreet values for in phase and out-of-phase signals.

A further object of this invention is a novel phase sensitive A.C. limiting circuit in which a reference signal controls the output limit to a discreet R.M.S. value and fixed waveform.

Another object of this invention is a novel phase sensitive A.C. limiting circuit in which transistors are used in place of limiting diodes, a reference signal controlling the conduction voltage of the transistors.

These and other objects and a fuller understanding of the invention may be had by referring to the following description and claims, read in conjunction with the accompanying drawings in which:

FIGURE 1 is a schematic diagram of the novel limiting circuit; and

FIGURE 2 illustrates graphically waveforms produced in the circuit of FIGURE 1.

Referring now to FIGURE 1, a source of alternating voltage $V_s$ having a source impedance of $R_s$ produces an alternating voltage $V_E$ at point E. The alternating voltage may be assumed to be produced by the preceeding stage of the system, and is an error signal having a phase which is indicative of error polarity and amplitude which is indicative of error magnitude. The error signal $V_E$ is fed through resistor $R_1$ and load resistor $R_L$ to thereby produce an output $V_o$ across the load resistor. As shown, one side of the source $V_s$ and one side of the load $R_L$ are grounded.

A limiting circuit is connected across the load at point F. The limiting circuit is in the form of a bridge, the bridge comprising rectifiers $CR_1$ and $CR_2$, and resistors $R_2$ and $R_3$. The two rectifiers $CR_1$ and $CR_2$ are connected with opposite polarities to point F. The junction intermediate the two resistors $R_2$ and $R_3$ is grounded. The other two corners of the bridge, illustrated at A and B, are connected through series resistor $R_4$ and $R_5$ respectively to opposite corners of a bridge rectifier network. Connected to the other corners of the bridge rectifier network is an alternating reference voltage produced at the primary winding of transformer $T_1$, and conducted to the bridge rectifier through the secondary winding of transformer $T_1$. The secondary winding of $T_1$ has a grounded center-tap.

Connected between the transformer secondary winding, at points C and D, and the corners of the bridge rectifier, are resistors $R_6$ and $R_7$ respectively. As will be explained, the reference voltage is shaped by means of the resistors and the bridge rectifier and conducted to points A and B to thereby provide a bias to limiting diodes $CR_1$ and $CR_2$.

Assume initially that the reference voltage is in phase with and of the same frequency as the error voltage $V_E$. Assume also that voltage levels at A, B, C, and D are large compared to the diode conduction potentials. During the positive half-cycle, that is, when points F and C are positive with respect to ground, a current path exists from point C through resistor $R_6$, rectifier $CR_4$, resistor $R_5$ and resistor $R_3$ to ground. Neglecting diode voltage drops, the bias voltage at point B is determined by the equation:

$$V_B = \frac{R_3}{R_3 + R_5 + R_6} \times V_{R1}$$

where $V_B$ and $V_{R1}$ are instantaneous voltages.

During the negative half-cycle, that is when point F is negative and when point C is negative, point D will then be positive and a current path exists from ground through resistor $R_2$, resistor $R_4$, rectifier $CR_3$ and resistor $R_6$ to point C. Neglecting again the diode voltage drops, voltage at point A at this time is determined by the equation:

$$V_A = \frac{R_2}{R_2 + R_4 + R_6} \times V_{R1}$$

where $V_A$ and $V_{R1}$ are instantaneous voltages.

Thus during the in-phase condition the output voltage $V_o$, that is the voltage at point F, is determined by the voltages at A and B described by the above equations. If $R_L$ and $R_1$ are much greater than $R_2$ and $R_3$, the limit value of $V_o$ is defined as follows:

$$V_o \text{ (limit) positive} = \frac{R_3}{R_3 + R_5 + R_6} \times V_{R1}$$

$$V_o \text{ (limit) positive} = \frac{R_3}{R_2 + R_4 + R_6} \times V_{R1}$$

where $V_o$ and $V_{R1}$ are instantaneous voltages.

If $R_2$ is equal to $R_3$ and if $R_4$ is equal to $R_5$, then the discrete R.M.S. limit value of $V_O$ is defined as follows for an in-phase condition:

$$V_O \text{ (limit) R.M.S.} = \frac{R_3}{R_3+R_5+R_6} \times V_{R1} \text{ (R.M.S.)}$$

$$= \frac{R_2}{R_2+R_4+R_6} \times V_{R1} \text{ (R.M.S.)}$$

It should be noted here that since both equations contain the term $R_6$, the in-phase R.M.S. value of $V_O$ may be controlled by varying the resistance of resistor $R_6$ and/or the voltage $V_{R1}$.

When the error voltage $V_E$ is 180° out-of-phase with the reference voltage, during the positive half-cycle, that is when points F and D are positive, a current path exists from the point D through resistors $R_7$, rectifier $CR_6$, resistors $R_5$ and $R_3$ to ground. The voltage at point B is thereby determined by the equation:

$$V_B = \frac{R_3}{R_3+R_5+R_7} \times V_{R2}$$

where $V_B$ and $V_{R2}$ are instantaneous voltages.

During the negative half-cycle, that is when point F is negative and point C is positive, point D will be negative and a current path exists from ground through resistor $R_2$, resistor $R_4$, rectifier $CR_5$ and resistor $R_7$ to point D. The voltage at A is thereby determined by the equation:

$$V_A = \frac{R_2}{R_2+R_4+R_7} \times V_{R2}$$

where $V_A$ and $V_{R2}$ are instantaneous voltages.

For this condition, the output voltage $V_O$ limit at point F will be determined by the equations:

$$V_O \text{ (limit) negative} = \frac{R_2}{R_2+R_4+R_7} \times V_{R2}$$

$$V_O \text{ (limit) positive} = \frac{R_3}{R_3+R_5+R_7} \times V_{R2}$$

where $V_O$ and $V_{R2}$ are instantaneous voltages.

If $R_2$ is equal to $R_3$ and $R_4$ is equal to $R_5$, then the discrete R.M.S. limit value of $V_O$ is defined as follows for an out-of-phase condition:

$$V_O \text{ (limit) R.M.S.} = \frac{R_2}{R_2+R_4+R_7} \times V_{R2} \text{ (R.M.S.)}$$

$$= \frac{R_3}{R_3+R_5+R_7} \times V_{R2} \text{ (R.M.S.)}$$

Thus by controlling resistor $R_7$ and/or voltage $V_{R2}$, the out-of-phase limit of voltage $V_O$ may be controlled. $V_O$ will be a sinusoid if the desired limit value of $V_O$ is much greater than the diode conduction potentials of the rectifiers.

Thus by means of the reference voltage, the limiting voltages at points A and B are controlled. When the instantaneous voltage at points F is greater than the instantaneous voltage at B, rectifier $CR_2$ conducts and the instantaneous load voltage is limited to the voltage at point B plus the conduction voltage drop across rectifier $CR_2$. Similarly, when the voltage at point F is less than the instantaneous voltage at point A, rectifier $CR_1$ conducts and the instantaneous load voltage at point F will be the voltage at point A plus the conduction voltage drop across rectifier $CR_1$.

FIGURE 2 shows typical waveforms for the bias voltages at points A and B for both in-phase and out-of-phase conditions. The curves of FIGURE 2 assume that $R_2=R_3$, that $R_4=R_5$, that voltage $V_{R1}=V_{R2}$, and that resistor $R_7$ is larger than resistor $R_6$.

In FIGURE 2, when voltage $V_C$ is positive and voltage $V_D$ is negative, the voltage at point A is determined by flow of current through resistor $R_7$, and the voltage at point B is determined by the flow of current through resistor $R_6$. When point D is positive and point C is negative, the voltage at point A is determined by current flow through resistor $R_6$, while the voltage at point B is determined by the current flow through resistor $R_7$.

Resistors $R_4$ and $R_5$ may be eliminated from the circuit, the resistance values being combined with $R_6$ and $R_7$ respectively. The parameter which varies the limits in the in-phase and out-of-phase condition is the ratio between the current paths containing the resistors $R_6$ and $R_7$. By unbalancing the ratio of the resistances, the voltages at points A and B may be varied to thereby limit the output voltage for the in-phase and out-of-phase conditions to the desired values. It is obvious that the resistance value of either $R_6$ or $R_7$ may be zero. It is further obvious that the resistance values $R_4$, $R_5$, $R_6$, and $R_7$ may be zero; in this case the limit values (in and out-of-phase) may be controlled by varying the ratio of $V_{R1}$ to $V_{R2}$.

While the circuit has been described as producing a sinusoidal output voltage, it is apparent that by incorporating a triangular reference voltage, a triangular output voltage will be realized. The same relationship holds true whether the reference voltage be a sinusoid, a triangular wave, a square or rectangular wave, or any other wave shape. In addition, while the frequency of the reference voltage will generally be the same as that of the input error voltage, e.g. 400 cycles for aircraft, the circuit will operate when the frequencies are different. The frequency and waveform of the reference signal will determine the frequency and waveform of the output.

Where the voltage levels of the input or error signal are not much larger than the diode conduction potential, the well-known technique of adding proper direct current voltage sources will permit satisfactory operation of the circuit. For example, a battery in series with A.C. source $V_S$ will provide a D.C. current path through the $R_3$, $R_5$, $R_6/R_7$ path or the $R_2$, $R_4$, $R_6/R_7$ path. The D.C. voltage must be of a magnitude to compensate for the A.C. voltage drops across the diodes $CR_1$, $CR_2$, $CR_3$ . . . $CR_6$.

If $R_2$ and $R_3$ are not much smaller than $R_1$, then the R.M.S. limit voltage will not be discreet but will increase as a function of the induced voltage drops across $R_2$ and $R_3$ due to the input voltage $V_E$. Substitution of transistors in lieu of rectifiers $CR_1$ and $CR_2$ will permit reduction of $R_1$ to zero and will improve the efficiency of the circuit. For example, a p-n-p transistor would replace $CR_1$, the base junction being tied to point A, the emitter to point F and the collector to point E ($R_1$ being zero); an n-p-n transistor would replace $CR_2$, its base junction being tied to point B, its emitter to point F and its collector to point E. The transistors would conduct only when the emitter voltage was greater in magnitude than the base voltage thereby limiting point F to the base voltage. For maximum flatness a well-known Darlington configuration utilizing 2 boot-strapped transistors for each rectifier may be used.

While the invention has been described in its preferred embodiment, it is obvious that changes may be made in the circuit components and in the combination and arrangement of parts without departing from the spirit and scope of the invention as hereinafter claimed.

I claim:
1. In an A.C. circuit having a source of alternating input voltage and an output voltage connection, means for limiting the magnitude of the output voltage comprising first and second conducting means connected to said output connection, a source of reference voltage for biasing said first and second conducting means to opposite polarities, said conducting means conducting to limit said output voltage when said input voltage exceeds said bias, first impedance means connected between said reference voltage source and said first and second conducting means for producing a bias of one value when said input voltage is in phase with said reference voltage, and a second impedance means connected between said reference voltage source and said first and second conducting means for producing a bias of a different value when said input voltage is out of phase with said reference voltage.

2. An A.C. limiting circuit as in claim 1 and including a diode bridge connected between said first and second impedance means and said first and second conducting means, and in which said reference voltage is an alternating voltage of the same frequency as said input voltage, said reference voltage source comprising a transformer having a primary winding and a secondary winding, one of said impedance means being connected in series between each end of said secondary winding and the input of said diode bridge, and the output of said diode bridge being connected to said first and second conducting means.

3. An A.C. limiting circuit as in claim 2 in which said first and second conducting means are diodes.

4. An A.C. limiting circuit as in claim 2 in which said first and second conducting means are transistors.

5. An A.C. limiting circuit as in claim 2 in which said first and second impedance means are resistors.

6. An A.C. limiting circuit as in claim 2 and including a source of D.C. voltage connected in series with said alternating input voltage source.

References Cited by the Examiner

IBM Technical Disclosure Bulletin, Sine Wave Amplitude Limiter, Vol. 2, No. 4, Dec. 1959, pages 29, 30.

LLOYD McCOLLUM, *Primary Examiner.*